United States Patent [19]
Jeong

[11] Patent Number: 5,687,294
[45] Date of Patent: Nov. 11, 1997

[54] RUNNING CONTROL SYSTEM OF ROBOT AND METHOD THEREOF

[75] Inventor: Joon-Young Jeong, Seoul, Rep. of Korea

[73] Assignee: Samsung Electronics Co., Ltd., Suwon, Rep. of Korea

[21] Appl. No.: 478,374

[22] Filed: Jun. 7, 1995

[30] Foreign Application Priority Data

Jun. 7, 1994 [KR] Rep. of Korea ............. 94-12717

[51] Int. Cl.$^6$ .................. G06F 9/44; G06F 15/50
[52] U.S. Cl. ................... 395/93; 395/3; 395/90; 901/23; 901/1; 318/568.16; 318/568.12; 318/587; 364/461
[58] Field of Search ................. 395/3, 90, 93; 901/23, 1; 318/568.16, 568.12, 587; 364/461

[56] References Cited

U.S. PATENT DOCUMENTS

| | | | |
|---|---|---|---|
| 4,700,302 | 10/1987 | Arakawa et al. | 364/424 |
| 5,400,244 | 3/1995 | Watanabe et al. | 364/461 |
| 5,402,051 | 3/1995 | Fujiwara et al. | 318/587 |
| 5,545,960 | 8/1996 | Ishikawa | 318/587 |

FOREIGN PATENT DOCUMENTS 93-12664   7/1993   Rep. of Korea .

*Primary Examiner*—George B. Davis
*Attorney, Agent, or Firm*—Burns, Doane, Swecker & Mathis, L.L.P.

[57] ABSTRACT

A running control system of a mobil robot performs a fuzzy inference according to a position error, directional error and instantaneous directional angle detected in the travel of the robot, so that the robot can travel accurately to a target point and perform operations such as cleaning and monitoring. An obstacle detecting unit detects whether or not there is an obstacle within a prescribed area to be traveled by the robot and for detecting a distance to the obstacle.

6 Claims, 15 Drawing Sheets

FIG.6

| Θe / Pe | | | LB | LS | Zo | Rs | RB | | |
|---|---|---|---|---|---|---|---|---|---|
| RB | Ls | Ls | Zo | Rs | Rs | RB | RB | RB | RB |
| Rs | LB | Ls | Ls | Zo | Rs | Rs | RB | RB | RB |
| Zo | LB | LB | Ls | Ls | Zo | Rs | Rs | RB | RB |
| Ls | LB | LB | LB | Ls | Ls | Zo | Rs | Rs | RB |
| LB | LB | LB | LB | LB | Ls | Ls | Zo | Rs | Rs |

| θe\Pe | LB | LS | Z | RS | RB |
|---|---|---|---|---|---|
| RB | LS | LS | Z | RS | RS |
| RS | LB | LS | LS | Z | RS |
| Z | LB | LB | LS | LS | Z |
| LS | LB | LB | LB | LS | LS |
| LB | LB | LB | LB | LB | LS |

FIG.7B

| θe\Pe | LB | LS | Z | RS | RB |
|---|---|---|---|---|---|
| RB | LS | Z | RS | RS | RB |
| RS | LS | LS | Z | RS | RS |
| Z | LB | LS | LS | Z | RS |
| LS | LB | LB | LS | LS | Z |
| LB | LB | LB | LB | LS | LS |

FIG.7C

| θe\Pe | LB | LS | Z | RS | RB |
|---|---|---|---|---|---|
| RB | Z | RS | RS | RB | RB |
| RS | LS | Z | RS | RS | RB |
| Z | LS | LS | Z | RS | RS |
| LS | LB | LS | LS | Z | RS |
| LB | LB | LB | LS | LS | Z |

FIG.7D

| θe\Pe | LB | LS | Z | RS | RB |
|---|---|---|---|---|---|
| RB | RS | RS | RB | RB | RB |
| RS | Z | RS | RS | RB | RB |
| Z | LS | Z | RS | RS | RB |
| LS | LS | LS | Z | RS | RS |
| LB | LB | LS | LS | Z | RS |

FIG.7E

| θe\Pe | LB | LS | Z | RS | RB |
|---|---|---|---|---|---|
| RB | RS | RB | RB | RB | RB |
| RS | RS | RS | RB | RB | RB |
| Z | Z | RS | RS | RB | RB |
| LS | LS | Z | RS | RS | RB |
| LB | LS | LS | Z | RS | RS |

FIG.8A

| Pe \ θe | LB | LS | Z | RS | RB |
|---|---|---|---|---|---|
| RB | 0 | 0 | 0 | 0 | 0 |
| RS | 0 | 0 | 0 | 0 | 0 |
| Z | 0 | 0 | 0 | 0 | 0 |
| LS | 0 | 0 | 0 | 0 | 0 |
| LB | 0 | 0 | 0 | 0 | 0 |

FIG.8B

| Pe \ θe | LB | LS | Z | RS | RB |
|---|---|---|---|---|---|
| RB | 0 | 0 | 0.4 | 0.4 | 0 |
| RS | 0 | 0 | 0.5 | 0.5 | 0 |
| Z | 0 | 0 | 0 | 0 | 0 |
| LS | 0 | 0 | 0 | 0 | 0 |
| LB | 0 | 0 | 0 | 0 | 0 |

FIG.8C

| Pe \ θe | LB | LS | Z | RS | RB |
|---|---|---|---|---|---|
| RB | 0 | 0 | 0.4 | 0.4 | 0 |
| RS | 0 | 0 | 0.4 | 0.4 | 0 |
| Z | 0 | 0 | 0 | 0 | 0 |
| LS | 0 | 0 | 0 | 0 | 0 |
| LB | 0 | 0 | 0 | 0 | 0 |

FIG.8D

| Pe \ θe | LB | LS | Z | RS | RB |
|---|---|---|---|---|---|
| RB | 0 | 0 | 0 | 0 | 0 |
| RS | 0 | 0 | 0 | 0 | 0 |
| Z | 0 | 0 | 0 | 0 | 0 |
| LS | 0 | 0 | 0 | 0 | 0 |
| LB | 0 | 0 | 0 | 0 | 0 |

FIG.8E

| Pe \ θe | LB | LS | Z | RS | RB |
|---|---|---|---|---|---|
| RB | 0 | 0 | 0 | 0 | 0 |
| RS | 0 | 0 | 0 | 0 | 0 |
| Z | 0 | 0 | 0 | 0 | 0 |
| LS | 0 | 0 | 0 | 0 | Q |
| LB | 0 | 0 | 0 | 0 | 0 |

FIG.12

| d \ Ve | VF | F | Z | S | VS |
|---|---|---|---|---|---|
| S | DB | DB | DB | DS | Z |
| M | DB | DB | DS | Z | IS |
| L | DB | DS | Z | IS | IB |

FIG.13

| d \ Ve | VF | F | Z | S | VS |
|---|---|---|---|---|---|
| S | 0 | 0 | 0 | 0.6 | 0.2 |
| M | 0 | 0 | 0 | 0.4 | 0.2 |
| L | 0 | 0 | 0 | 0 | 0 |

RUNNING CONTROL SYSTEM OF ROBOT AND METHOD THEREOF

BACKGROUND OF THE INVENTION

1. Field of the Invention

The present invention relates to a mobile robot for running along a studied path to perform works such as cleaning, monitoring and the like, and more particularly to a running control system of a robot so that the robot can run accurately to a target point.

2. Description of the Prior Art

A running control system of a robot, as a prior art, was disclosed by the present applicant in Korean Patent application No. 93-12664 (Jul. 6, 1993).

The running control system of a robot in the prior art receives from a control means a running distance and a directional angle data detected by running distance detecting means and directional angle detecting means at a predetermined interval of time to thereby perform an operation on a position coordinate with regard to a path control of the robot, directional angle and instantaneous directional angle.

Results of the determined position coordinate, directional angle and the instantaneous directional angle are input to a path control fuzzy inference unit to thereby calculate output variation magnitudes ($\Delta$,Ud) of left and right running motors for controlling the robot running along the path.

Furthermore, the directional angle data detected by the directional angle detecting means is input to a weight operating unit along with the operated position coordinate and directional angle to thereby calculate a weight (m) for determining path control output variation magnitudes of the left and right running motors according to a running direction of the robot.

The weight (m) calculated by the weight operating unit is multiplied according to an operator by the output variation magnitude calculated from the path control fuzzy inference unit, thereby calculating final path control output variation magnitudes (m·$\Delta$Ud) of the left and right running motors.

Meanwhile, running distance data proportionate to revolutions of the left and right powered wheels and detected by the running distance detecting means is compared with a reference speed pre-established at the control means and with the operator, and the result thereof is input to a speed control fuzzy inference unit along with obstacle distance data detected by obstacle detecting means, to thereby calculate speed control output variation magnitude ($\Delta$Uf) of the left and right running motors for controlling a running speed of the robot.

The path control output variation magnitude (m·$\Delta$Ud) and the speed control output variation magnitude ($\Delta$Uf) obtained respectively from the path control fuzzy inference unit and speed control fuzzy inference unit are employed along with output magnitudes $U_L$ (t-1) and $U_R$ (t-1) of the left and right running motors inherently stored in the control means prior to unit time, to thereby calculate final left and right motor output magnitudes as in the following way.

A final output magnitude of the left running motor 12 thus calculated is:

$$U_L(t) = U_L(t-1) + \Delta Ud + \Delta Uf.$$

a final output magnitude of the right running motor (14) is:

$$U_R(t) = U_R(t-1) - \Delta Ud + \Delta Uf.$$

However, there is a problem in that, when the weight (m) is applied to the output variation magnitude ($\Delta$Ud) of the left and right running motors by utilizing an instantaneous directional angle in a running control method thus described, a stable running control is possible by increasing or decreasing the output magnitude (m·$\Delta$Ud) according to a current running status, but when the floor on which the robot is to travel is not flat, weight should be varied according to the state of the floor, thereby complicating the running control of the robot.

Furthermore, there is another problem in that the contents of the membership function applied to the path control fuzzy inference unit should be varied to thereby prevent an appropriate fuzzy interference from being performed in relation to sudden change of the floor surface, so that the robot cannot maintain a stable running state.

SUMMARY OF THE INVENTION

Accordingly, the present invention has been disclosed to solve the aforesaid problems, and it is an object of the present invention to provide a running control system of a robot and a method thereof by which a fuzzy inference can be performed for varying output magnitude of left and right running motors according to position error, directional angle error and instantaneous directional angle varying in the course of the robot running, so that the robot can maintain a predetermined running speed regardless of sudden change of a floor surface to thereby cause the same to reach a target point accurately.

In accordance with one aspect of the present invention, there is provided a running control system of a mobil robot for running along a studied path to perform given operations, the system comprising:

control means for controlling an overall running operation of the robot;

driving means for moving the robot according to control of the control means;

running distance detecting means for detecting a running distance of the robot moved by the driving means;

directional angle detecting means for detecting a running direction of the robot varied by the driving means; and obstacle detecting means for detecting whether or not there is an obstacle within a prescribed area to be travelled by the robot and for detecting a distance to the obstacle.

In accordance with another aspect of the present invention, there is provided a running control method of a robot, the method comprising the steps of:

calculating a path error for calculating a position error, directional angle error and instantaneous directional angle of the robot according to a running distance data detected by the running distance detecting means and a directional angle data detected by the directional angle detecting means;

performing a path control fuzzy inference for controlling a running path of the robot so that path control output variation magnitudes of the left and right running motors can be calculated according to the data obtained from the path error calculating step;

calculating a speed error for calculating a speed error of the robot by comparing a reference speed with the running distance data detected by the running distance detecting means and at the same time for calculating a distance to the obstacle by way of the obstacle detecting means;

performing a speed control fuzzy inference for controlling the running speed of the robot so that the speed control output variation magnitudes of the left and right running motors according to the data calculated by the speed error calculating step; and calculating a motor output magnitude for calculating a final output magnitudes of the left and right running motors according to the path control output variation magnitude calculated by the path control fuzzy inference step and the speed control output variation magnitude calculated by the speed control fuzzy inference step.

BRIEF DESCRIPTION OF THE DRAWINGS

For a better understanding of the nature and objects of the invention, reference should be made to the following detailed description taken in conjunction with the accompanying drawings in which:

FIG. 6 is a schematic diagram for illustrating an input and output rule creation table for indicating an input and output relation of the path control fuzzy inference unit;

FIGS. 7A, 7B, 7C, 7D and 7E are a schematic diagram for illustrating an input and output rule table relating to a directional angle input and a position coordinate input of the path control fuzzy inference unit;

FIGS. 8A, 8B, 8C, 8D and 8E are examples of actual inputs and output rule tables of the path control fuzzy inference unit;

FIG. 12 is a schematic diagram for illustrating an input and output rule table of the speed control fuzzy inference unit;

FIG. 13 is an example of an actual input and output rule table of the speed control fuzzy inference unit;

DETAILED DESCRIPTION OF A PREFERRED PREFERRED EMBODIMENT OF THE INVENTION

The embodiment of the present invention will now be described in detail with reference to the accompanying drawings.

Figure 1:
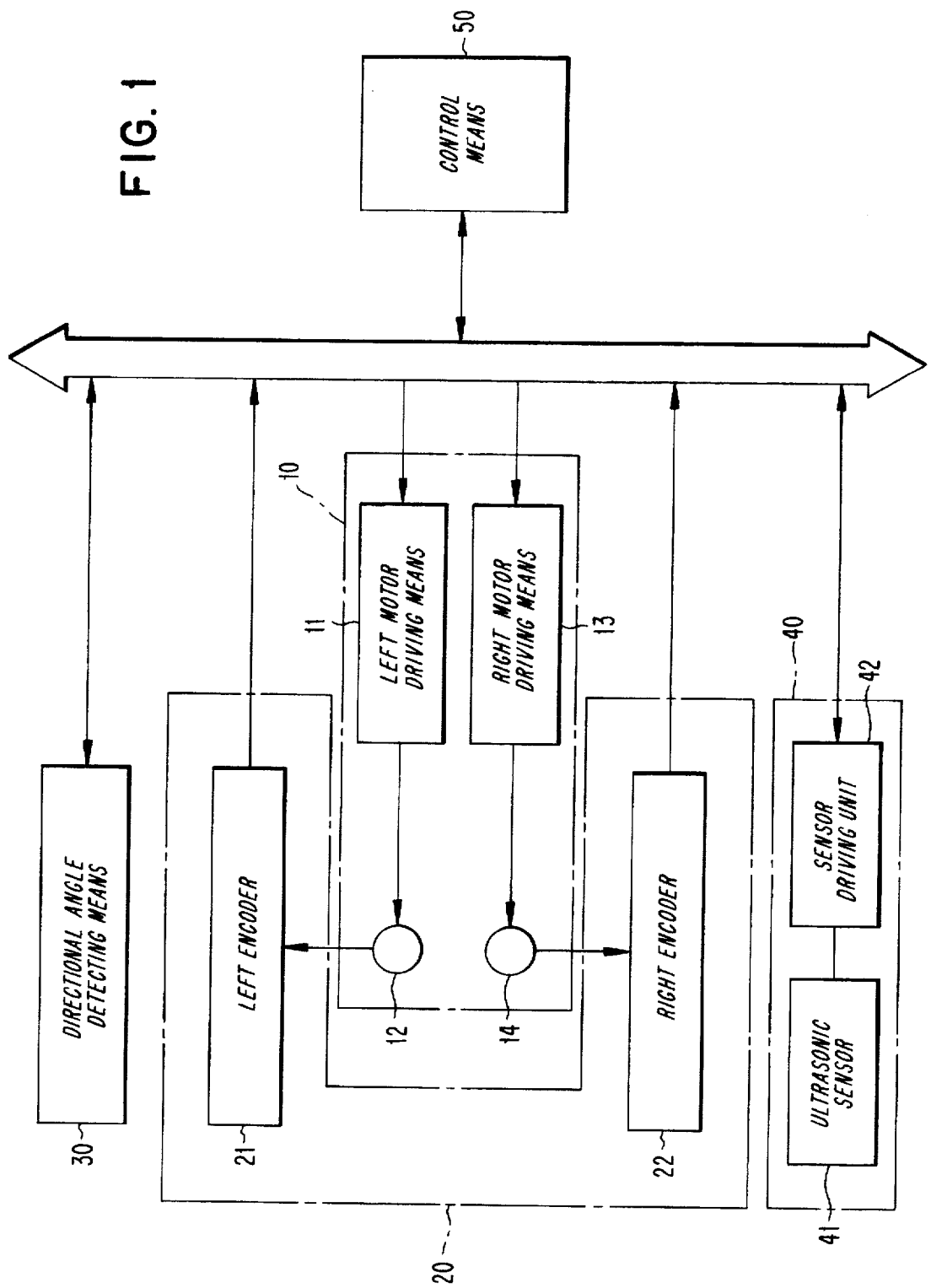
FIG. 1 is a block diagram of a running control system of a robot according to one embodiment of the present invention.

As shown in FIG. 1, the driving means 10 serves to control movement of the robot in the forward, backward, left and right directions, wherein the driving means 10 includes a left motor driving unit 11 for driving the left running motor 12 so that the robot can be moved in the right direction and a right motor driving unit 13 for driving the right running motor 14 so that the robot can be moved in the left direction.

The left running motor 12 and the right running motor 14 are respectively provided with driving wheels (not shown).

The running distance detecting means 20 serves to detect a running distance of the robot moved by the driving means 10, wherein the running distance detecting means 20 includes a left encoder 21 for generating a pulse signal proportionate to revolutions of the left running motor 12 to thereby detect the running distance covered by the robot to the right direction, and a right encoder 22 for generating a pulse signal proportionate to revolutions of the right running motor 14 to thereby detect a running distance covered by the robot to the left direction.

Furthermore, the directional angle detecting means 30 is a directional sensor such as a gyro sensor or the like for detecting a running direction variation of the robot by detecting a rotational angle speed according to a voltage level changing in the course of rotation of the robot so that the running direction variation of the robot travelling according to the driving means 10 can be detected.

The obstacle detecting means 40 serves to detect whether or not there exists an obstacle along a running path of the robot and to detecting a distance to the obstacle, where the obstacle detecting means 40 includes an ultrasonic sensor 41 for generating ultrasonic waves forward of the robot and for receiving a signal of the generated ultrasonic waves reflected from a surface of the obstacle, to thereby detect the obstacle existing in front of the robot, and a sensor driving unit for driving a stepping motor (not shown) so that the ultrasonic sensor 41 can swing 180 degrees reciprocatively.

Control means 50 in the drawing is a control processing unit CPU for receiving at a predetermined interval, (a) a running distance data detected by the running distance detecting means 20 and a running direction data detected by the directional angle means 30, to thereby perform an operation for a present position of the robot, and (b) a data concerning the obstacle detected by the obstacle detecting means 40, to thereby perform an operation for determining a distance to an obstacle existing forward of and left and right sides of the robot. A fuzzy inference is performed according to that information so that the running path and running speed of the robot can be controlled and the robot can be controlled to run accurately to a target point without straying from a normal track.

A fuzzy inference with regard to the running path and running speed of the robot thus constructed will now be described with reference to FIG. 2.

Figure 2:
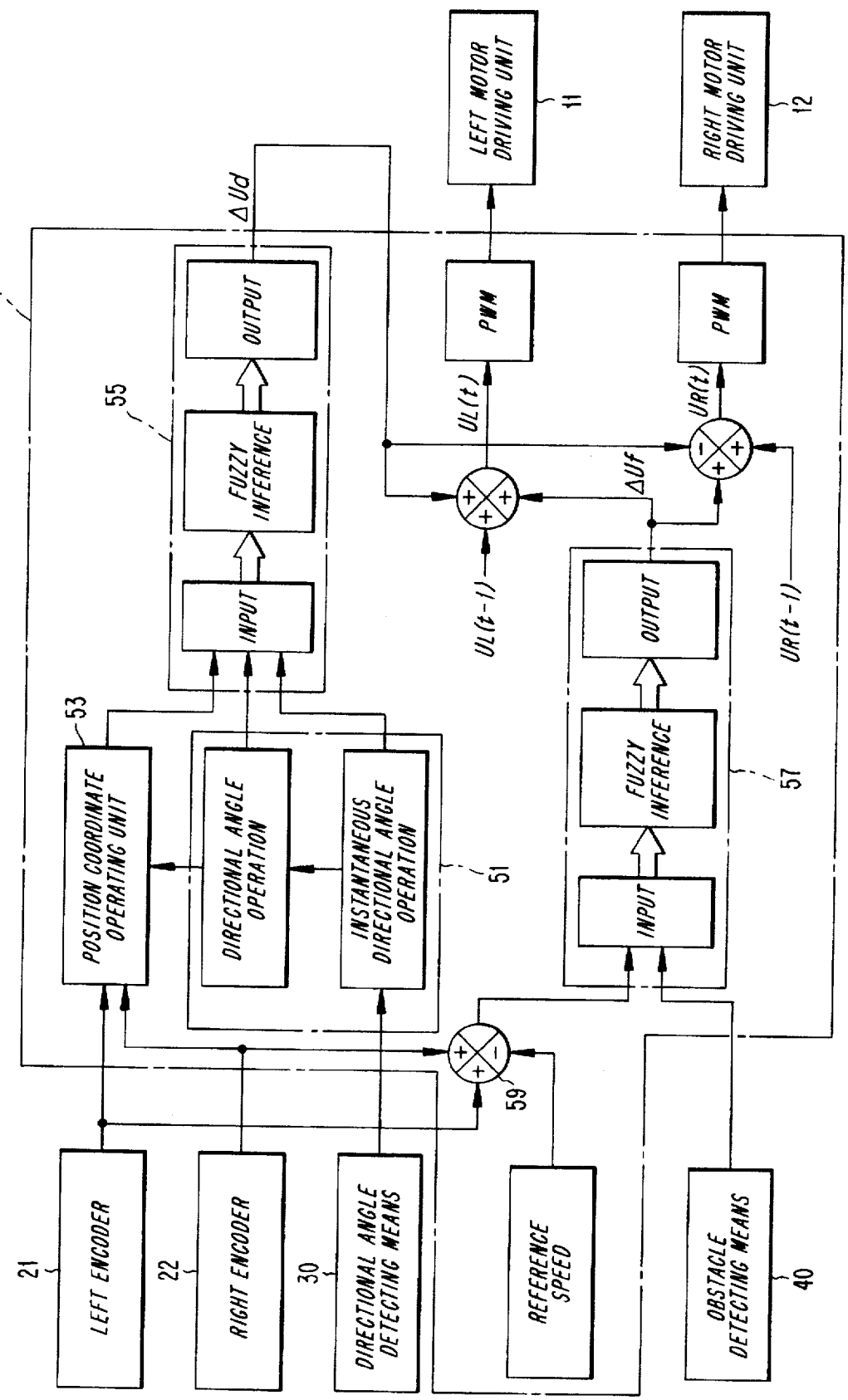
FIG. 2 is a control block diagram with regard to fuzzy inference of the running control system of the robot according to the embodiment of the present invention.

As illustrated in FIG. 2, when the running distance data detected by the running distance detecting means 20 and the running direction data detected by the directional angle detecting means 30 are input to the control means 50 at the predetermined interval, a directional angle operating unit 51 of the control means 50 performs an operation for determining an instantaneous directional angle (Δθ) for indicating an angle variation per unit time of the robot according to the running direction data input therefrom, and performs an operation for determining an overall directional angle as a function of the instantaneous directional angle (Δθ) to thereby calculate a directional angle error (θe) for indicating a difference between a target running direction and a current direction of the robot.

At this time, the overall directional angle determined by the directional angle operating unit 51 is input to a position coordinate operating unit 53 of the control means 50 for performing an operation for determining an absolute position of the robot.

The position coordinate operating unit 53 receives the overall directional angle determined by the directional angle operating unit 51 and the running distance data detected by the running distance detecting means 20 to thereby be input at the predetermined interval, and performs an operation for determining the position coordinate of the robot so that a position error (Pe) indicating a perpendicular distance strayed by the robot from the target path can be calculated.

Results of the position error (Pe), directional angle (θe) and the instantaneous directional angle (Δθ) of the robot determined by the directional angle operating unit 51 and the position coordinate operating unit 53 are input to a path control fuzzy inference unit 55, where a fuzzy inference for controlling the running path of the robot is performed to cause the robot to run to the target point accurately so that the path control output variation magnitude (ΔUd) of the left and right running motors 12 and 14 can be calculated.

Meanwhile, the running distance data detected by the running distance detecting means 20 is compared, at an operator 59, with the reference speed pre-established at the control means 50, and a speed error (Ve) indicating a target running speed and the current speed of the robot is determined.

The speed error (Ve) determined at the operator 59 is input to a speed control fuzzy inference unit 57 along with a distance data to the obstacle detected by the obstacle detecting means 40 to thereby calculate a speed control output variation magnitude (ΔUf) for controlling the running speed of the robot so that the robot can run at a targeted predetermined speed.

The path control output variation magnitude (ΔUd) calculated at the path control fuzzy inference unit 55 and the speed control fuzzy inference unit 57 and the speed control output variation magnitude (ΔUf) are employed along with left and right running motor output magnitudes $U_L$ (t−1) and $R_R$ (t−1) inherently stored prior to the unit time according to formulae listed below, to thereby calculate final motor output magnitudes as shown in the following ways.

Left running motor (12) output magnitude $$U_L(t)=U_L(t-1)+\Delta Ud+\Delta Uf \quad (1)$$

Right running motor (14) output magnitude $$U_R(t)=U_R(t-1)+\Delta Ud+\Delta Uf \quad (2)$$

At this time, a pulse width modulation (PWM) signal, resulting from a pulse width being modulated, is output from the control means 50 to the left and right motor driving units 11 and 13 according to the final output magnitudes $U_L$ (t) and $U_R$ (t) of the left and right running motors calculated above, thereby driving the left and right running motors 12 and 14.

Now, a fuzzy inference method of the path control fuzzy inference unit will be described with reference to FIG. 3 through FIG. 9.

Figure 3:
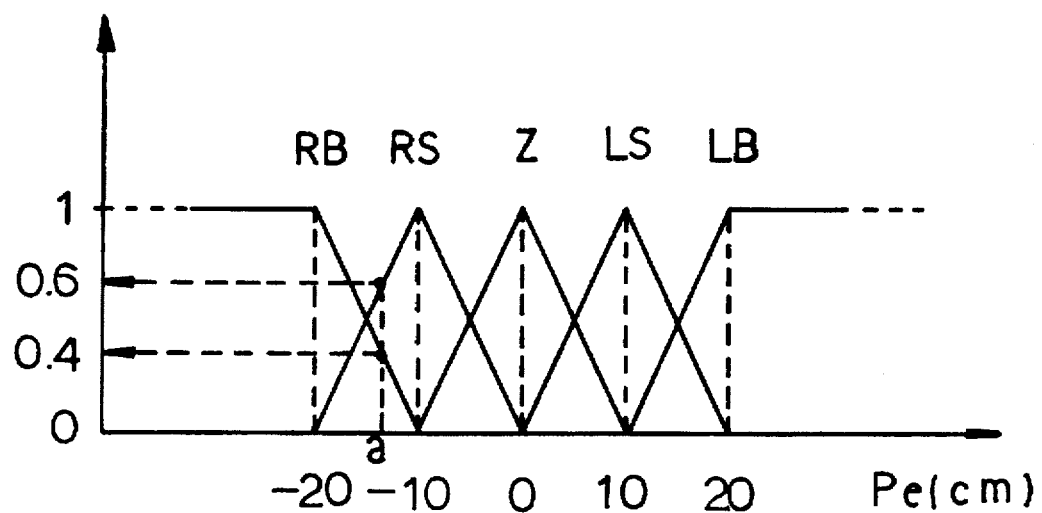
FIG. 3 is a schematic diagram for illustrating a membership function of a position coordinate as an input of a path control fuzzy inference unit.

FIG. 3 is a membership function of a position coordinate as an input of the path control fuzzy inference unit 55 and it is an input membership function for illustrating a position error (Pe) indicating a straight distance covered by the robot from the target path.

In FIG. 3, reference letter Z indicates that a running position of the robot is on "a normal track", RB indicates that the running position of the robot is "extremely leaned toward the right side" from the normal track Z, RS indicates that the running position of the robot is "a little bit leaned toward the right side" from the normal track Z, LS indicates that the running position of the robot is "a little bit leaned toward left side" from the normal track Z and reference letter LB indicates that the running position of the robot is "extremely leaned toward the left side" from the normal track Z.

Figure 4:
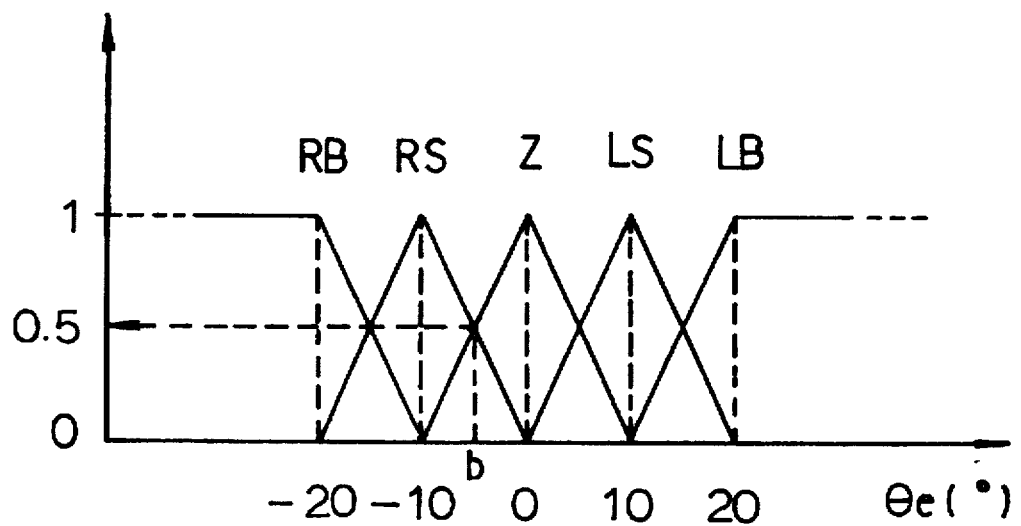
FIG. 4 is a schematic diagram for illustrating a membership function of a directional angle as an input of the path control fuzzy inference unit.

FIG. 4 is a membership function of the directional angle as an input of the path control fuzzy inference unit 55 and it is an input membership function for illustrating a directional angle error (θe) indicating a difference between a target running direction and a current direction of the robot.

In FIG. 4, reference letter Z indicates that the running direction of the robot is "in a normal direction", RB indicates that the running direction of the robot is "extremely leaned toward right side" from the normal direction Z, RS indicates that the running direction of the robot is "a little bit leaned toward the right side" from the normal direction Z, LB indicates that the running direction of the robot is "a little bit leaned toward the left side" from the normal direction Z, and reference letter LS indicates that the running direction of the robot is "extremely leaned toward the left side" from the normal direction Z.

Figure 5:
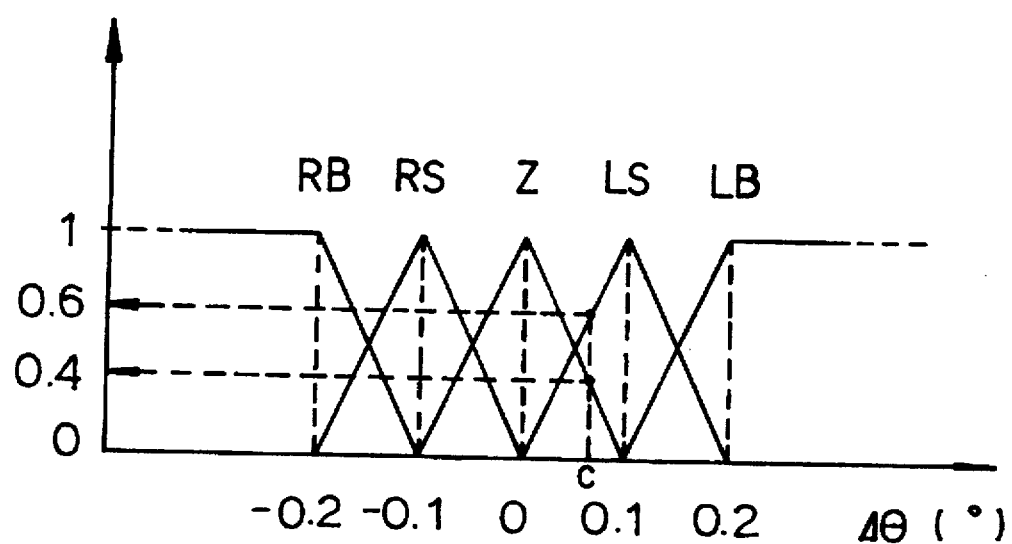
FIG. 5 is a schematic diagram for illustrating a membership function of an instantaneous directional angle as an input of the path control fuzzy inference unit.

FIG. 5 is a membership function of an instantaneous directional angle as an input of the path control fuzzy inference unit 55 and it is an input membership function for illustrating an instantaneous directional angle (Δθ) indicating an angle variation of the robot per a unit time.

In FIG. 5, reference letter Z indicates that the instantaneous directional angle of the robot is in "a normal direction", RB indicates that the instantaneous directional angle of the robot is "extremely leaned toward the right side" from the normal direction Z, RS indicates that the instantaneous directional angle of the robot is "a little bit leaned toward the right side" from the normal angle Z, LB indicates that the instantaneous directional angle of the robot is "a little bit leaned toward the left side" from the normal direction Z, and reference letter LS indicates that the instantaneous directional angle of the robot is "extremely leaned toward the left side" from the normal direction 2.

In other words, in FIG. 5 the instantaneous directional angle (Δθ) of the robot greatly affected by a sudden variation of a floor state is used as an input membership function of the path control fuzzy inference unit 55, so that an appropriate fuzzy inference can be performed according to the floor state changing in the travel of the robot.

FIG. 6 is an input and output rule creation table for illustrating an input and output relation of the path control fuzzy inference unit 55, and FIGS. 7A through 7E are input and output rule tables for illustrating an output fuzzy function against a directional angle input and position coordinate input of the path control fuzzy inference unit 55.

First of all, when an instantaneous directional angle (Δθ) relating to an absolute position of the robot in FIG. 6 is zero (0), an input and output rule table relating to the directional angle input (Δe) and the position coordinate input (Pe) is created as shown in heavy bold lines.

A separate input and output rule table (5×5) relating to respective directional angle input (Δe) and position coordinate input (Pe) is created, where the path control fuzzy inference unit 55 takes two lattices to the left when the instantaneous directional angle (Δθ) is LS, the unit 55 takes one lattice when the angle (Δθ) is LB, the unit 55 takes one lattice to the right when the angle (Δθ) is RS, and the path control fuzzy inference unit 55 takes two lattices to the right when the instantaneous directional angle (Δθ) is RB.

In other words, the input and output rule table (5×5) of the path control fuzzy inference unit 55 is shown in FIG. 7A when the instantaneous directional angle (Δθ) is LS, FIG. 7B when that angle is LB, FIG. 7C when that angle is zero, FIG. 7D when that angle is RS, and FIG. 7E when the instantaneous directional angle (Δθ) is RB.

Referring to the above, when the input and output rule table of the path control fuzzy inference unit 55 is created according to sizes of the instantaneous directional angle (Δθ), the smallest value is inserted into a position corresponding to membership function value of the directional angle input (Δe) and position coordinate input (Pe).

FIG. 8 is an example of an actual input and output rule table against the directional angle input and position coordinate input of the path control fuzzy inference unit 55, where the smallest value is inserted that corresponds to an input membership function from the five inputs and output rule tables illustrated in FIGS. 7A through 7E, to thereby calculate a discrete tabulation.

Figure 9:
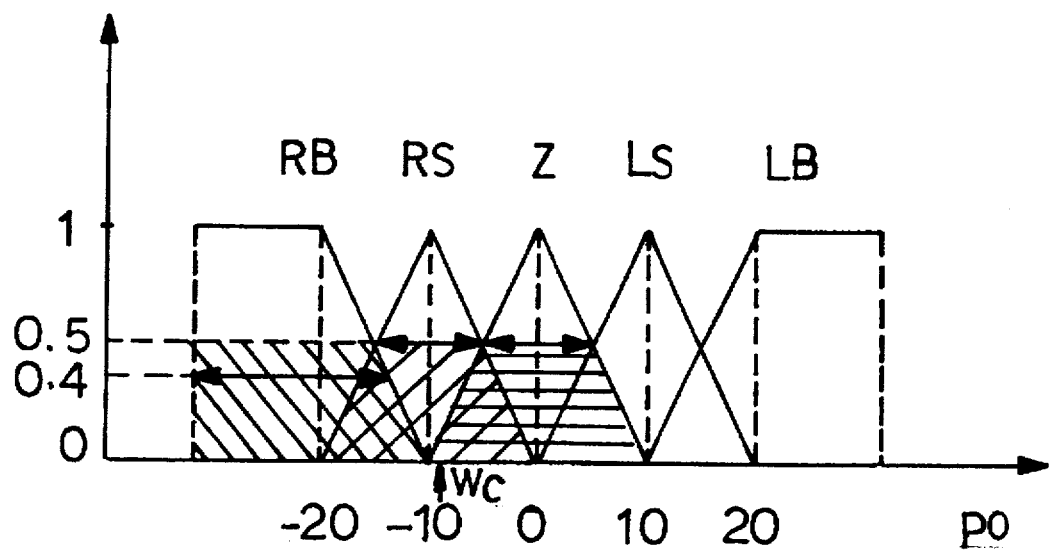
FIG. 9 is a schematic diagram for illustrating a membership function of the path control output variation magnitude according to the path control fuzzy inference.

FIG. 9 is a membership function of the path control output variation magnitude according to the path control fuzzy inference, where reference letter Z indicates that the path control output variation magnitude is "invariable", RB indicates that an output at the right side is much increased, meaning that an output of the left running motor 12 is increased, RS indicates that "the output of the right side is a little bit increased", LB indicates that "an output at the left side is a little bit increased", and RB indicates that "the output at the left side is much increased", meaning that an output of the right running motor 14 is increased.

As for the path control output variation magnitude, areas constituting respective output function values are calculated from respective output function values obtained from FIG. 3 through FIG. 8, and a weight center of the areas is calculated, which is taken as a path control output variation magnitude (ΔUd).

Now, a detail description of a method for calculating the path control output variation magnitude (ΔUd) according to the path control fuzzy inference is given as below.

First of all, according to graphs illustrated in FIGS. 3, 4, and 5, membership functions of the position error (Pe), directional angle (Δe) and instantaneous directional angle (Δθ) as inputs of the path control fuzzy inference unit 55 are obtained.

When the membership functions relating to the position error (Pe), directional angle (Δe) and instantaneous directional angle (Δθ) are obtained as above, the smallest value out of the three function values is inserted into positions corresponding to respective functions of the position error (Pe), directional angle (Δe) and the instantaneous directional angle (Δθ) illustrated in FIG. 7.

When the function values obtained by the above method are inserted into 125 lattices illustrated in FIG. 7, an actual input and output rule table against the directional angle input (Δe) and position coordinate input (Pe) of the path control fuzzy inference unit 55 illustrated in FIG. 8 can be completed.

As seen from the above, when the actual input and output rule table of the path control fuzzy inference unit 55 is completed, function values of 5 output groups (LS, LB, Z, LB and LS) illustrated in FIG. 7 are obtained.

The output function value is obtained from the larger value out of 5 output groups illustrated in FIG. 8, and areas relating to respective fuzzy variables are obtained according to results selected in the above.

A weight center (Wc) is calculated from the above obtained areas according to the following formula (3) which is taken as path control output variation magnitude (ΔUd).

$$WC = \frac{SPo(RB) \cdot (-20 - Po(RB)/4) + SPo(RS) \cdot (-10) + SPo(Z) \cdot 0}{SPo(RB) + SPo(RS) + SPo(Z)} \quad (3)$$

Next, a fuzzy inference method of speed control fuzzy inference unit will be described with reference to FIG. 10 through FIG. 14.

Figure 10:
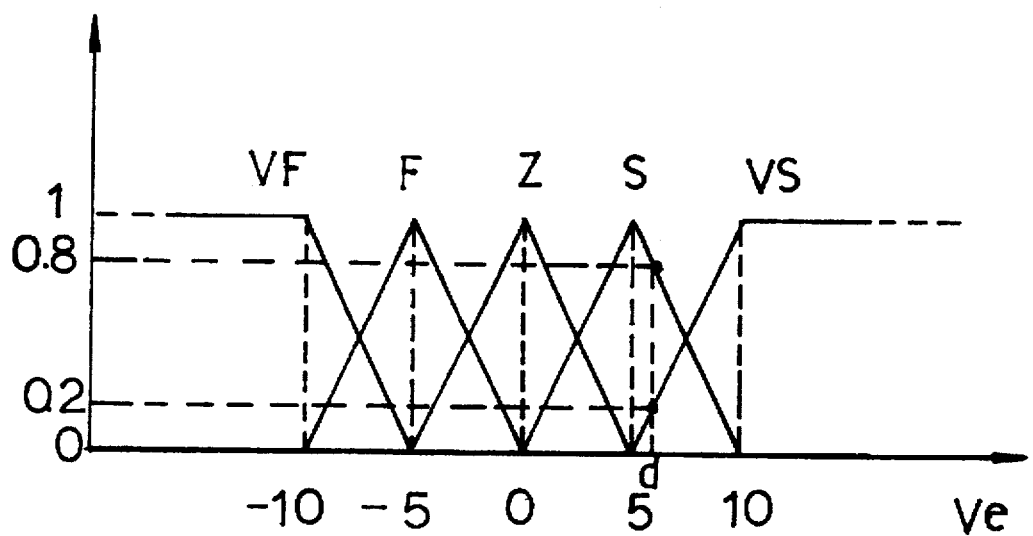
FIG. 10 is a schematic diagram for illustrating a membership function of a speed error as an input of speed control fuzzy inference unit.

FIG. 10 is a membership function of a speed error as an input of the speed control fuzzy inference unit 57, which is an input membership function for illustrating the speed error (Ve) corresponding to a difference between the target running speed and the current speed of the robot by comparing the running distance data detected by the running distance detecting means 20 with the reference speed pre-established at the control means 50.

In FIG. 10, reference letter Z indicates that the running speed of the robot is "normal", VF indicates that the running speed thereof is "much faster" than the normal speed Z, F indicates that the running speed is "faster" than the normal speed Z, S indicates that the running speed is "slower" than the normal speed Z, and VS indicates that the running speed of the robot is "very slower" than the normal speed 8.

Figure 11:
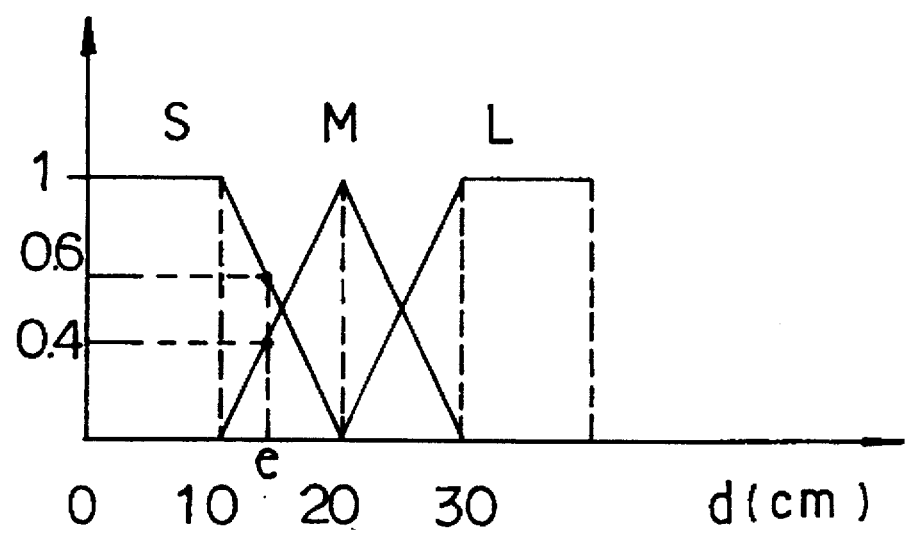
FIG. 11 is a schematic diagram for illustrating a membership function of an obstacle distance as an input of the speed control fuzzy inference unit.

FIG. 11 is a graph for illustrating a membership function of obstacle distance as an input of the speed control fuzzy inference unit 57, which is an input membership function for illustrating a distance (d) to an obstacle existing forward of the robot.

In FIG. 11, reference letter M indicates that distance d to the obstacle is "normal", S indicates that the distance d to the obstacle is "farther than" normal M.

Figure 13:
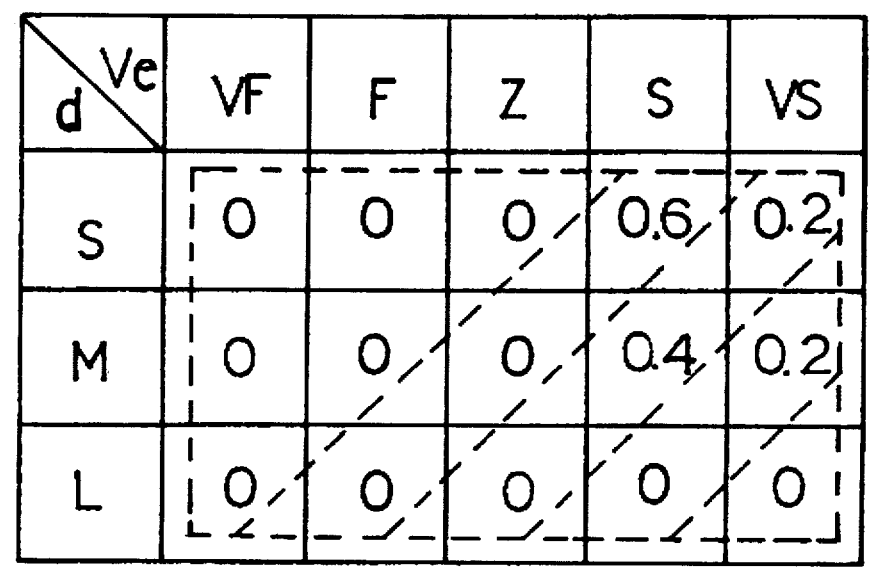

FIG. 12 is a graph of an input and output rule table for illustrating an output fuzzy function against the speed error input (Ve) and the obstacle distance input (d) of the speed control fuzzy inference unit 57, and FIG. 13 is an example of an actual input and output rule table against the speed error input (Ve) and obstacle distance input (d) of the speed control fuzzy inference unit 57, which is a discrete tabulation calculated by inserting the smallest value corresponding to an input membership function from the 5 input and output rule table illustrated in FIG. 12.

Figure 14:
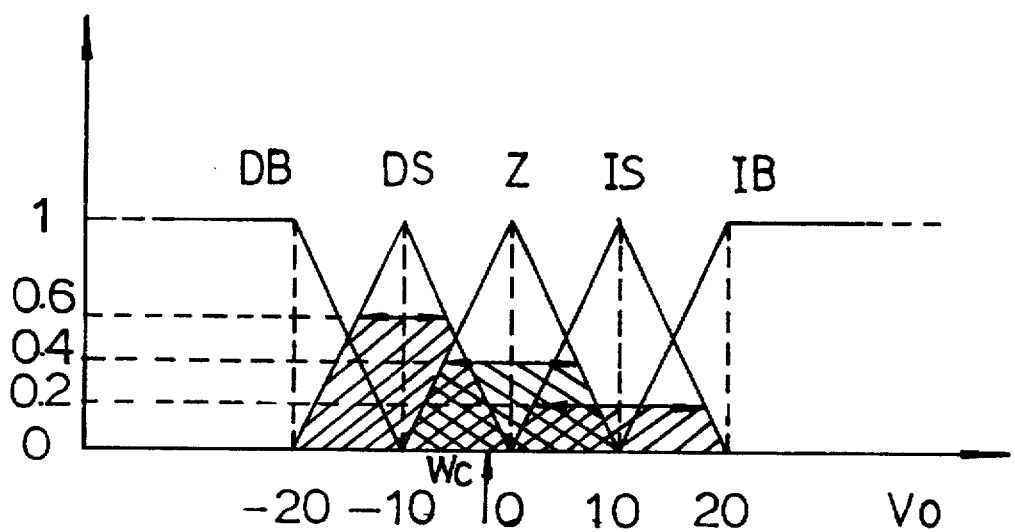
FIG. 14 is a schematic diagram for illustrating a membership function of the speed control output variation magnitude according to the speed control fuzzy inference.

FIG. 14 is a graph for illustrating a membership function of the speed control output variation magnitude according to the speed control fuzzy inference, where reference letter Z indicates that the speed control output variation magnitude is "invariable output", DB indicates that "output has much decreased", DS indicates that "the output has a little bit decreased", IS indicates that "the output has a little bit increased" and IB indicates that "the output has much increased".

The speed control output variation magnitude calculates areas constituted by respective membership functions by way of respective output membership functions obtained from FIGS. 10 and 11, and a weight center (Wc) thereof is calculated, and a value of the weight center is taken as speed control output variation magnitude (ΔUf).

A detail description of a method for calculating the speed control output variation magnitude (ΔUf) according to the speed control fuzzy inference will now be explained.

First of all, membership functions of the speed error (Ve) and distance d to the obstacle as input of the speed control fuzzy inference unit 57 is obtained according to the graphs in FIG. 10 and 11.

When membership function values relating to the speed error (Ve) and the distance d to the obstacle are obtained, the smallest value of the two function values is inserted into the positions corresponding to the respective functions of the speed error (Ve) and the distance d to the obstacle.

When the function values thus obtained are all inserted into 25 lattices illustrated in FIG. 12, an actual input and output rule table relating to the speed error input (Ve) and obstacle distance input (d) of the speed control fuzzy inference unit 57 illustrated in FIG. 13 is completed.

When the actual input and output rule table of the speed control fuzzy inference unit 57 is thus completed, function values for 5 output groups, DB, DS, Z, IS and IB illustrated in FIG. 13 are obtained.

The output function value is selected from the largest values in 5 output groups illustrated in FIG. 13, and areas relating to the respective fuzzy variables are obtained according to the results thus selected.

A weight center (Wc) is calculated from the areas thus obtained according to the following formula (4), which is taken as the speed control output variation magnitude ($\Delta Uf$).

$$WC = \frac{SV_o(DS) \cdot (-10) + SV_o(Z) \cdot 0 + SV_o(IS) \cdot 10}{SV_o(DS) + SV_o(Z) + SV_o(IS)} \quad (4)$$

The path control output variation magnitude ($\Delta Ud$) and the speed control output variation magnitude ($\Delta Uf$) thus obtained are substituted into formulae (1) and (2) to thereby calculate a left motor output magnitude $C\ U_L(t)$ and a right motor output magnitude $C\ U_R(t)$.

Then, the control means 50 performs a pulse width modulation thereon, and control values of the left and right running motors 12 and 14 are output to the left motor driving unit 11 and to the right motor driving unit 13 according to the results calculated therefrom.

Accordingly, the left and right motor driving units 11 and 13 receive a pulse control signal output from the control means 50 to thereby drive the left and right running motors 12 and 14, so that the robot can maintain a predetermined running speed to thereby travel to the target point accurately.

Now, a running control apparatus of a robot thus constructed and a method of operation thereof will be described.

Figure 15A:
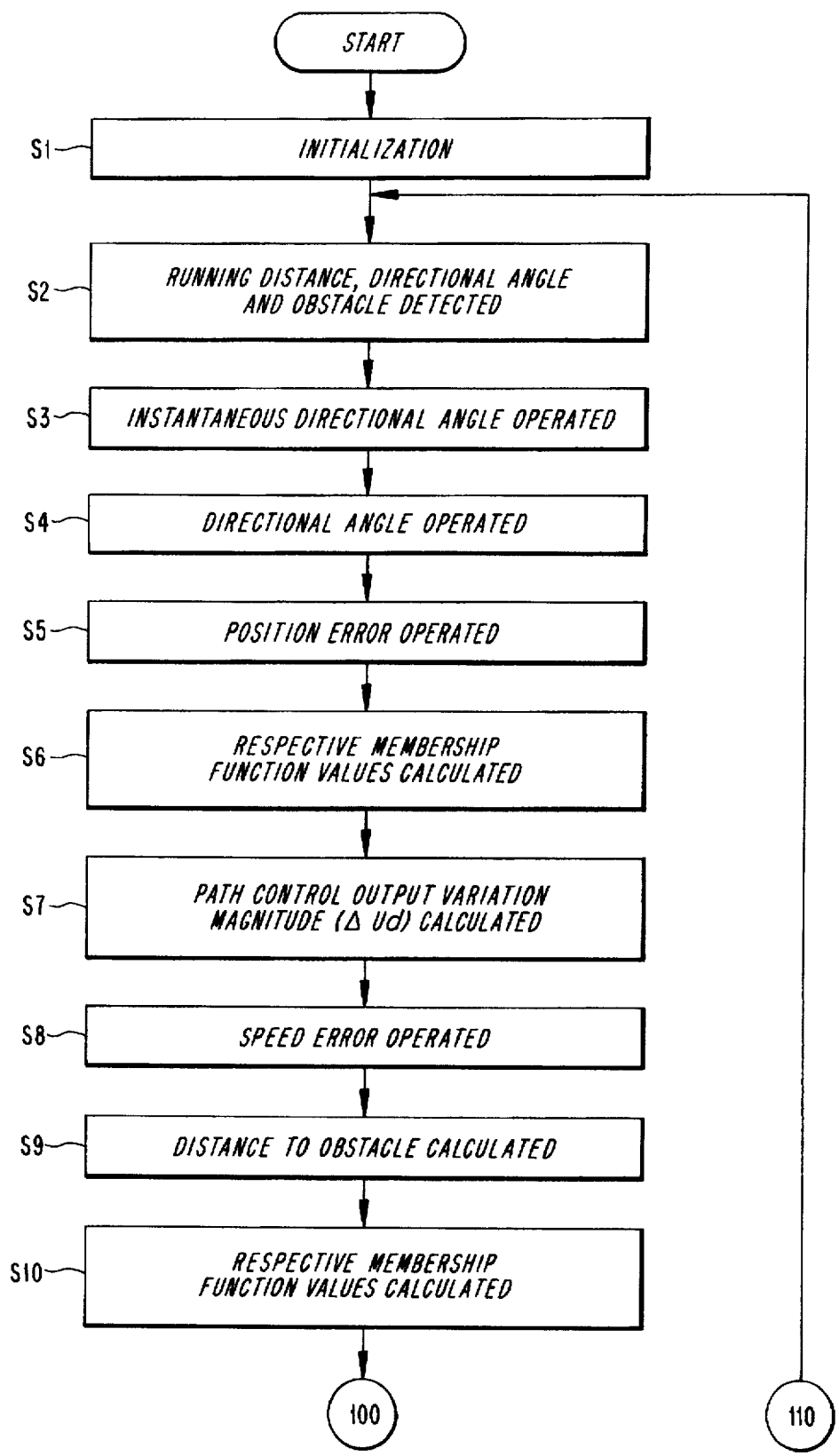
FIGS. 15A and 15B are flow charts for illustrating running control operating procedures of the robot according to the present invention.
Figure 15B:
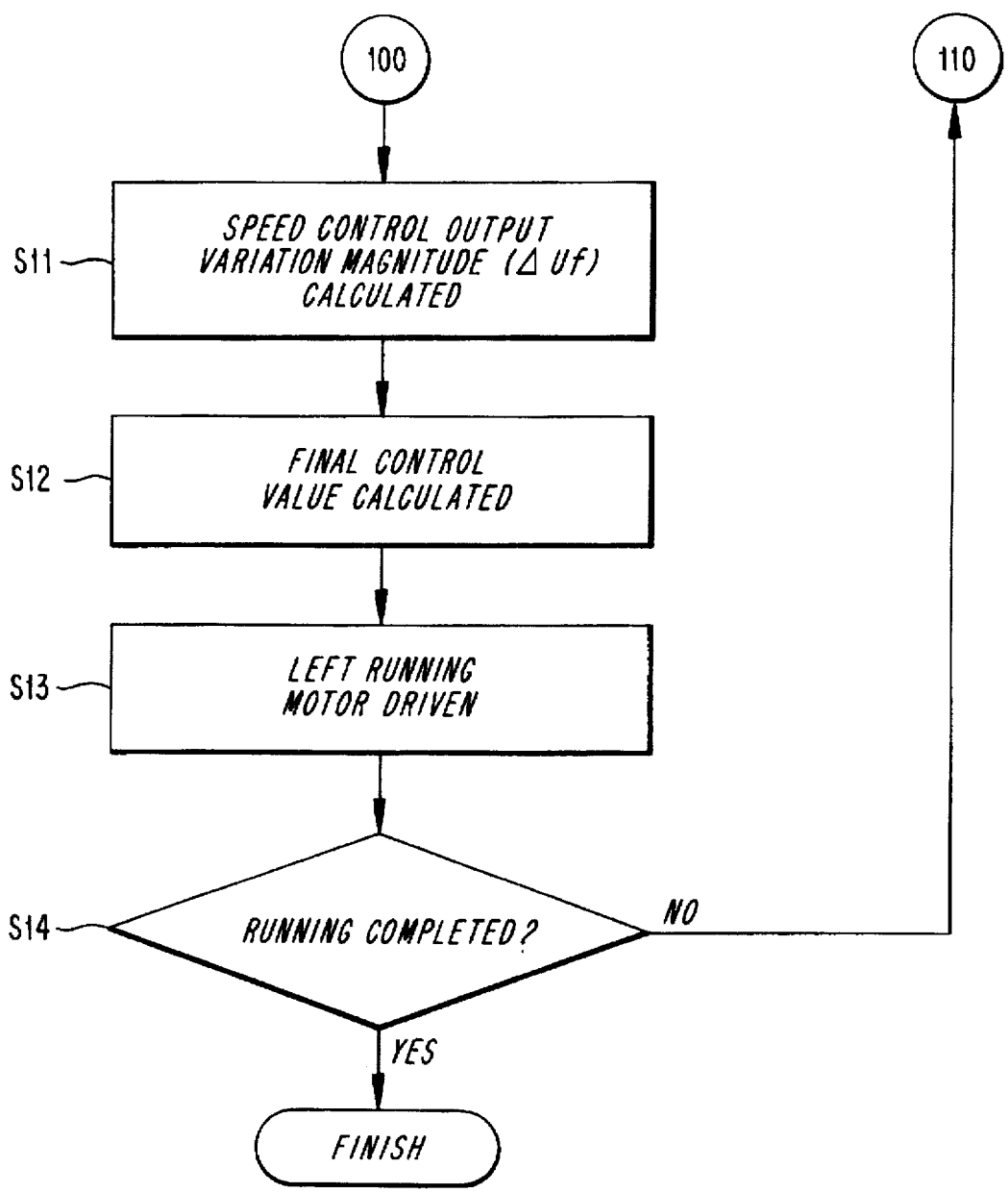

FIGS. 15A and 15B are flow charts for illustrating operational procedures of running control for the robot according to the present invention, and reference letter S in the Figure indicates "step".

First of all, when a user turns on an operation switch disposed at a predetermined position of the robot, the control means 50 receives at step S1 a driving voltage supplied from a power supply source (not shown) to thereby initialize the robot according to a running operational function thereof, so that the robot can start operation according to an operation command input by the user.

Then, the driving means 10 receives at step S2 a control signal output from the control means 50 to thereby drive the left running motor 12 and the right running motor 14, so that the robot can start travelling.

At this time, a left encoder 21 generates a pulse signal proportionate to revolutions of the left driving wheel and outputs same to the control means 50, and a right encoder 22 generates a pulse signal proportionate to revolutions of the right driving wheel and outputs same to the control means 50.

Accordingly, the control means 50 receives revolution pulse signals output from the left and right encoders 21 and 22, and calculates a travel distance of the robot.

Meanwhile, the directional angle detecting means 30 detects rotary angle speeds of the left and right driving wheels and outputs rotary angle data detected therefrom to the control means 50.

The control means 50, therefore, performs an integration on the rotary angle data detected by the directional angle detecting means 30 against time, to thereby detect a travel direction variation of the robot.

The obstacle detecting means 40 reciprocates 180 degrees forward of the robot during the travel of the robot according to the drive of the left and right running motors 12 and 14, emits ultrasonic waves and receives a signal reflected from an obstacle to which the ultrasonic waves are emitted, and detects whether or not there exists an obstacle along the path of the robot and a distance to the obstacle, and outputs the data detected therefrom to the control means 50.

Accordingly, the control means 50 receives a running distance data detected by the running distance detecting means 20 and a directional angle data detected by the directional angle detecting means 30 at a predetermined interval.

Next, a directional angle operating unit 51 of the control means 50 receives the directional angle data detected by the directional angle detecting means 30, step S3, to thereby perform an operation with the instantaneous directional angle ($\Delta \theta$) for indicating an angle variation of the robot during the unit time period so that sudden changes in the state of the floor surface on which robot runs can be detected.

The directional angle operating unit 51 operates, step S4, an overall directional angle in order to detect a travel directional variation of the robot according to the result of the instantaneous directional angle ($\Delta \theta$) determined at step S3, to thereby determine a directional angle error ($\theta e$) indicating a difference between the target running direction and the current direction of the robot.

At this time, a position coordinate operating unit 53 receives, at step S5, the overall directional angle determined by the directional angle operating unit 51, along with the running distance data detected by the running distance detecting means 20 and input into the control means at a predetermined interval, to thereby perform an operation for determining the position coordinate of the robot, so that the position error (Pe) indicating a perpendicular distance of the robot from the target path can be operated.

When the position error (Pe), directional angle error ($\Delta e$) and instantaneous directional angle ($\Delta \theta$) of the robot are determined, data of position error (Pe), directional angle error ($\theta e$) and instantaneous directional angle ($\Delta \theta$) are input, at step S6, into a path control fuzzy inference unit 55 for performing a fuzzy inference with regard to the path control of the robot, so that membership functions values of the position coordinate, directional angle and instantaneous directional angle can be obtained.

First of all, a membership function of the position error (Pe), directional angle ($\Delta e$) and instantaneous directional angle input to the path control fuzzy inference unit 55 are obtained according to the graphs illustrated in FIGS. 3, 4 and 5.

By way of example, assume that the position error (Pe)=a (−14 cm), directional angle ($\theta e$)=b (−5C) and instantaneous directional angle ($\Delta \theta$)=c (0.06C) as input to the path control fuzzy inference unit 55.

The membership function values relating to the position coordinate (a) are RB (a)=0.4 and RS (a)=0.6 according to the graph illustrated in FIG. 3. The membership function values relating to the directional angle (b) are RS (b)=Z (b)=0.5 according to the graph illustrated in FIG. 4. The membership function values relating to the instantaneous directional angle (c) are Z (c)=0.4, and LS (c)=0.6 according to the graph illustrated in FIG. 5. Other values can be all calculated as 0.

When membership function values against the position coordinate (a), directional angle (b) and instantaneous directional angle (c) are obtained at the step S6, the path control output variation magnitude (ΔUd) of the left and right running motors 12 and 14 is calculated by the path control fuzzy inference unit 44 in order that the robot can be controlled to run along the targeted path according to the membership function values thus obtained, step S7.

First of all, the smallest values among the 3 input membership function values obtained at step S6 are inserted into positions corresponding to respective function values of the position coordinate (a), directional angle (b) and instantaneous directional angle (c).

In other words, min (0.04, 0.4, 0.5)=0.4 is inserted into {Z (c), RB (a), RS (b)}, and min (0.6, 0.6, 0.5)=0.5 is inserted into {LS (c), RS (a), Z (b)}.

When all the function values thus obtained are inserted into 125 lattices illustrated in FIG. 7, an actual input and output rule table relating to the directional angle input (θe) and position coordinate input (Pe) of the path control fuzzy inference unit 55 illustrated in FIG. 8 can be completed.

As seen from the above, when the actual input and output rule table of the path control fuzzy inference unit 55 is completed, function values of 5 output groups (LS), (LB), (Z), (LB) and (LS) illustrated in FIG. 7 are obtained.

The output function value which is selected is the largest value out of respective groupings, where Po (Z) becomes max (0, 0.5, 0, 0)=0.5 from (B) of FIG. 9, Po (Rs) becomes max {max (0.4, 0.4, 0.5, 0, 0), max (0, 0.4, 0.4, 0.4, 0, 0, 0)}=0.5 from (B) and (C) of FIG. 9, and Po (RB) becomes max (0.4, 0, 0)=0.4 from (C) of FIG. 9, and Po (LB) (LS)=0.

In other words, the largest value out of 5 output groupings illustrated in FIG. 8 is selected.

According to the thus-selected result, an area SPo (RB) =7.2 is obtained from Po (RB)=0.4, an area SPo (Z)=7.5 is obtained from fuzzy variable Po (Z)=0.5, and an area SPo (RS)=7.5 is obtained from Po (RS)=0.5.

Out of those areas, a weight center (Wc) is calculated according to the following formula (3), which is taken as the path control output variation magnitude (ΔUd).

$$WC = \frac{SPo(RB) \cdot (-20 - Po(RB)/4) + SPo(RS) \cdot (-10) + SPo(Z) \cdot 0}{SPo(RB) + SPo(RS) + SPo(Z)}$$

$$= \frac{7.2 \times (-20 - 0.1) + 7.5 \times (-10) + 7.5 \times 0}{7.2 + 7.5 + 7.5} = -9.9,$$

where the path control output variation magnitude is calculated.

Now, the running distance data detected by the running distance detecting means 20 is received by the control means at a predetermined interval and compared with the pre-established reference speed by way of operator 59, so that the speed error (Ve) indicating the target running speed and the current speed of the robot can be operated, step S8.

The distance data to the obstacle detected by the obstacle detecting means 40 is received by the control means 50, thereby determining whether or not there exists an obstacle forward of the robot and calculating a distance d to the obstacle, step S9.

When the distance d to the obstacle and speed error (ve) of the robot are calculated, data with regard to the speed error (Ve) and distance d to the obstacle thus calculated are input to the speed control fuzzy inference unit 57 for performing a fuzzy inference relating to the speed control of the robot, thereby calculating membership function values of the speed error (ve) and the distance d to the obstacle, step S10.

First of all, membership functions of the speed error (Ve) and distance do to the obstacle as input to the speed control fuzzy inference unit 57 are obtained according to the graph is illustrated in FIG. 10 and 11.

By way of example, assume that the speed error input to the speed control fuzzy inference unit 57, V3=e (6) and the distance d to the obstacle (d)=f (14 cm).

The membership function values relating to the speed error (e) according to the graph in FIG. 10, S (e)=0.8, and VS (e)=0.2, and the membership function values relating to a distance (f) to the obstacle according to the graph in FIG. 11, S (f)=0.6 and M (f)=0.4, while other values are all calculated as 0.

When the membership function values relating to speed error (e) and distance f to the obstacle are obtained at the step S10, speed control output variation magnitudes (ΔUf) of the left and right running motors 12 and 14 are calculated by the speed control fuzzy inference unit 57 in order to control the robot to travel at a predetermined speed according to the membership function values obtained int he above, step S11.

First of all, the smallest values out of two input membership function values obtained at the step S10 are inserted into positions corresponding to respective function values of the speed error (e) and distance f to the obstacle illustrated in FIG. 12.

In other words, {S (e), S (f)} is inserted by min (0.8, 0.6)=0.6 and {VS (e), S (F)} is inserted by min (0.2, 0.6)=0.2.

When the function values thus obtained are all inserted into 25 lattices illustrated in FIG. 12, an actual input and output rule table relating to the speed error input (Ve) and obstacle distance input (d) of the speed control fuzzy inference unit 57 illustrated in FIG. 13 can be completed.

As seen in the above, when the actual input and output rule table of the speed control fuzzy inference unit 57 is completed, function values of 5 output groups (DB), (DS), (Z), (IS) and (IB) illustrated in FIG. 13 are obtained.

The output function value is selected as the largest among the respective groupings, where Vo (DS) becomes max (0, 0, 0.6)=0.6 from FIG. 13, Vo (Z) becomes max (0, 0.4, 0.2)=0.4 from FIG. 13, Vo (IS) becomes max (0, 0.2)=0.2 from FIG. 14 and Vo (DS) (ZB)=0.

In other words, the largest value is selected out of 5 output groupings illustrated in FIG. 12.

According to the result thus selected, an area SVo (DS) =8.4 is obtained from Vo (DS)=0.6, an area SVo (Z)=6.4 is obtained from Vo (Z)=0.4, and an area SVo (IS)=3.6 is obtained from Vo (IS)=0.2, from which a weight center (Wc) is calculated according to the following formula (4), which is taken as the speed control output variation magnitude (ΔUf).

$$WC = \frac{SVo(DS) \cdot (-10) + SVo(Z) \cdot 0 + SVo(IS) \cdot 10}{SVo(DS) + SVo(Z) + SVo(IS)}$$

$$= \frac{8.4 \times (-10) + 6.4 \times (0) + 3.6 \times 10}{8.4 + 6.4 + 3.6} = -2.6$$

From the step S7 and step S11, when the path control variation magnitude (ΔUd) and the speed control output variation magnitude (ΔUf) of the left and right running motors 12 and 14 are calculated, the control means at step S12 adds to or deducts from output magnitudes of the left and right running motors 12 and 14 prior to the unit time period (the output magnitudes of the left and right running motors right before the unit time period) the path control output variation magnitude (ΔUd) and the speed control output variation magnitude (ΔUf), to thereby calculate a final driving control value which is a control value of the left and right running motors 12 and 14.

In other words, the thus-calculated speed control output variation magnitude (ΔUd) and the speed control output variation magnitude (ΔUf) of the left and right running motors 12 and 14 are determined according to the following formulae (1) and (2) and output magnitudes of the left and right running motors before the unit time period, to thereby calculate the final output magnitude of the left and right running motors 12 and 14.

Left running motor output magnitude $$U_L(t) = U_L(t-1) + \Delta Ud + \Delta Uf \quad (1)$$

Right running motor (14) output magnitude $$U_R(t) = U_R(t-1) + \Delta Ud + \Delta Uf \quad (2)$$

When the left running motor output magnitude $U_L(t)$ and right running motor output magnitude $U_R(t)$ are calculated, the control means 50 performs a pulse width modulation PWM on the above-calculated left running motor output magnitude and the right running motor output magnitude, to thereby output to the left motor driving unit 11 and the right motor diving unit 13 a pulse width modulation (PWM) signal as control values of the left and right running motors 12 and 14.

Accordingly, the left motor driving unit 11 and the right motor driving unit 13 receive the PWM signal output from the control means 50, step S13, to thereby drive the left running motor 12 and the right running motor 14, so that the robot can travel accurately to the target point at a predetermined running speed.

Now, the control means discriminates whether or not the robot has completed the travel, step S14, and if the travel has not been completed (in case of no), flow proceeds back to step S2, and performs repeatedly operations subsequent to step S2, and if the travel has been completed (in case of yes), the robot stops the running operation and completes the operation.

Next, an actual running experimented result of whether the robot travels accurately along the target path according to the aforementioned running control method even during a sudden state change of the floor surface on which the robot runs will be described with reference to FIGS. 16A and 16B.

Figure 16:
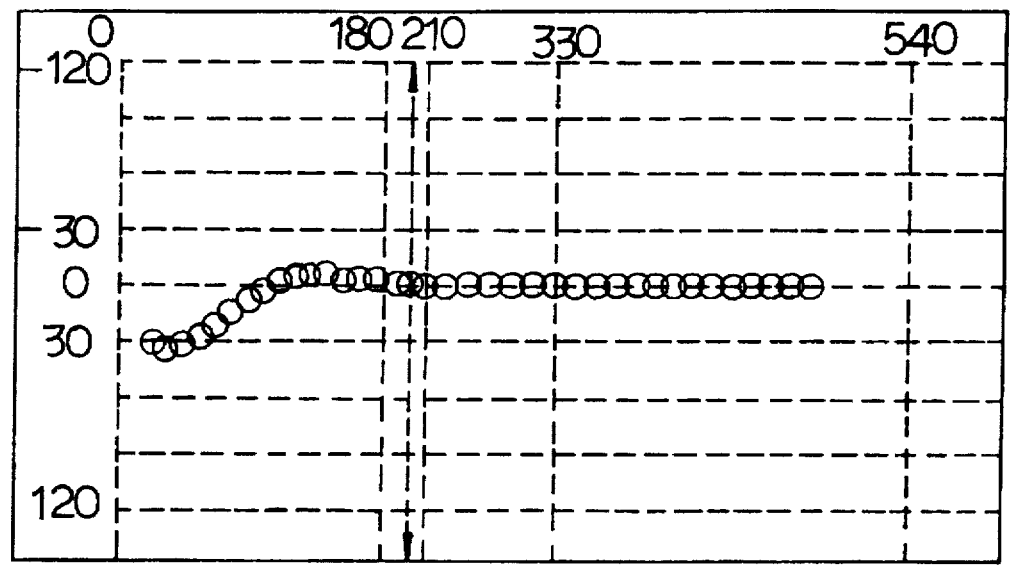
FIG. 16A is a schematic diagram for illustrating a running experiment result of the robot according to the present invention.
FIG. 16B is a schematic diagram for illustrating a running experiment result of a robot according to the prior art.
Figure 16:
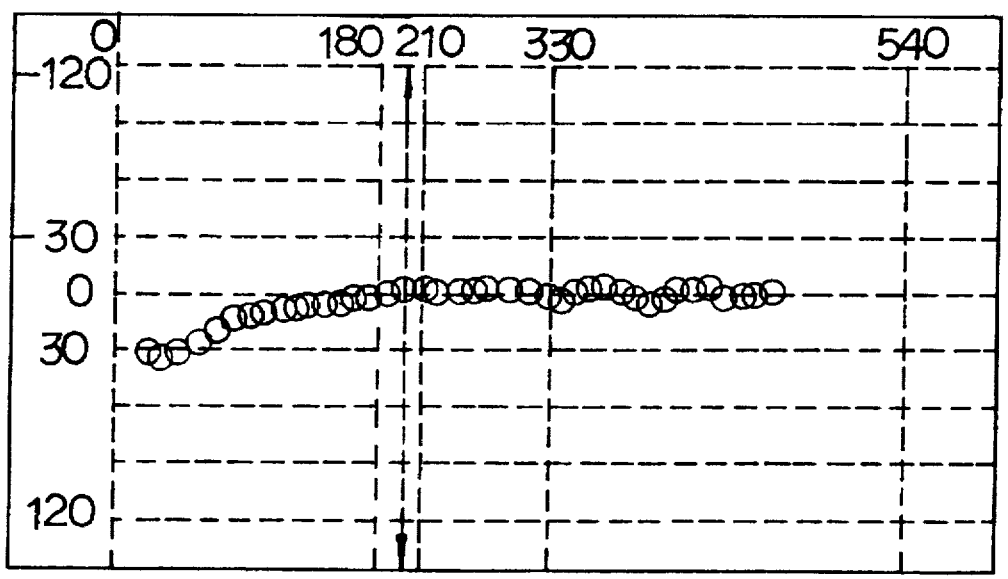

FIG. 16A, which reflects an experimental result of the robot according to the present invention, is a schematic diagram for illustrating an actual running result in consideration of an instantaneous directional angle (Δθ: angle variation in the unit time period) as an input of the path control fuzzy inference unit 55.

FIG. 16B, which reflects an experimental result of a robot according to a conventional way, is a schematic diagram for illustrating an actual running result without consideration of the instantaneous directional angle (Δθ) as an input of the path control fuzzy inference unit 55. First of all, a running start position is established at a point where it is 30 cm off a reference path and 30 degrees off to the right from a reference direction, so that the robot can be observed in its approach to the reference path.

Observation is also made as to a running state of the robot travelling from an approximate point of 2 m to a hard floor after the robot starts running on a thick fur carpet of 20 mm thickness.

At this time, a running speed of the robot is 20 cm/sec, and a sampling time is 20 msec.

Parameters of respective input membership functions are adjusted to fit to the travel of the robot on the carpet.

FIG. 16A (the invention) indicates that the robot has started running and maintained a stable approach to the reference path, and a running state can be ascertained that the robot travels accurately to the target point along an original reference path without being affected by a sudden change of floor surface after passing a 2-meter point.

Actually, the robot swerves from the reference path approximately 5 cm at the 2-meter border point where the floor surface starts to change in its state, but makes a comeback to the original reference path to perform a normal travel, so that it can be ascertained that the robot is appropriate enough to an unstable floor surface in its running control.

FIG. 16B (the prior art) however shows that, though the robot has started running and maintained a good approach to the reference path for a stable travel state, the robot has continuously maintained a zigzag running state after the 2-meter border point where the floor has started changing in its surface state, and the robot has not performed a stable movement to the target point.

As is apparent from the foregoing, according to the present invention of the running control system of the robot and a method thereof, a fuzzy inference for varying output magnitudes of the left and right running motors is performed according to the position error, directional angle error and instantaneous directional angle changing in the movement of the robot, so that the robot can maintain a predetermined constant running speed regardless of sudden changes of the floor surface to run to a target point accurately without swaying from a normal running track.

What is claimed is:

1. A running control system for guiding a robot comprising:

a controller for controlling an overall running operation of the robot in accordance with input signals supplied thereto;

a drive unit including left and right running motors connected to the controller for moving and guiding the robot in a running direction in accordance with an output signal from the controller;

a running distance detector connected to the controller for detecting a running distance of the robot moved by the drive unit and outputting a running distance signal proportionate thereto to the controller as one of the input signals;

a directional angle detector connected to the controller for detecting a running direction varied by the drive unit and outputting a directional angle signal proportionate thereto to the controller as one of the input signals; and an obstacle detector connected to the controller for detecting an obstacle within a prescribed area to be traversed by the robot and a distance to the obstacle and outputting an obstacle distance signal proportionate thereto to the controller as one of the input signals.

2. The system according to claim 1 wherein the controller includes:

a directional angle operating unit for receiving the directional angle signal and calculating an instantaneous directional angle, and an overall directional angle representative of a difference between a target running direction and a current direction of travel of the robot;

a position operating unit for receiving the overall directional angle from the directional angle operating unit, and the running distance signal, for calculating therefrom a position error of the robot;

a path control fuzzy inference unit for receiving the instantaneous directional angle from the directional angle operating unit and the position error from the position operating unit, for calculating therefrom path output variation magnitudes of the left and right running motors;

a speed error operator for comparing the running distance signal with a reference speed for calculating therefrom a speed error of the robot; and a speed control fuzzy inference unit for receiving the speed error from the speed error operator, and the obstacle distance signal, for calculating therefrom speed control output variation magnitudes for the left and right running motors.

3. The system according to claim 2 wherein the controller includes an operator for receiving the path control output variation magnitudes from the path control fuzzy inference unit, and the speed control output variation magnitudes from the speed control fuzzy inference unit for modifying the left and right running motor output magnitudes in accordance therewith.

4. A method of controlling the running of a robot having left and right drive motors, comprising the steps of:

A) detecting a running distance of the robot;

B) detecting a directional angle of travel of the robot;

C) determining from the detected running distance and detected directional angle a path error, a position error, a directional angle error, and an instantaneous directional angle of the robot;

D) performing a path control fuzzy inference using the path error to calculate path control output variation magnitudes of the left and right running motors;

E) calculating a speed error by comparing the running distance with a reference speed;

F) performing a speed control fuzzy interference using the speed error to calculate speed control output variation magnitudes of the left and right drive motors; and G) calculating from the path control output variation magnitudes and the speed control output magnitudes, final output magnitudes of the left and right drive motors.

5. The method according to claim 4 wherein the performing a path control fuzzy inference comprises calculating the path control output variation magnitudes as a function of a size of the instantaneous directional angle.

6. The method according to claim 4 further including the step of detecting an obstacle in a path of the robot, and determining from the speed error a distance to the detected obstacle.

* * * * *